United States Patent

Rao et al.

[11] Patent Number: 6,107,267
[45] Date of Patent: Aug. 22, 2000

[54] COMPOSITIONS COMPRISING $CF_3CF_2CHF_2$ AND THEIR MANUFACTURE

[75] Inventors: V. N. Mallikarjuna Rao, Wilmington, Del.; Allen Capron Sievert, Elkton, Md.; Munirpallam A. Subramanian, Kennett Square, Pa.

[73] Assignee: E. I. du Pont de Nemours and Company, Wilmington, Del.

[21] Appl. No.: 09/137,342

[22] Filed: Aug. 20, 1998

Related U.S. Application Data

[60] Provisional application No. 60/056,794, Aug. 25, 1997.
[51] Int. Cl.[7] ............................. C11D 7/30; C11D 7/50; B01D 3/36
[52] U.S. Cl. .................... 510/408; 510/410; 510/411; 252/2; 252/67; 252/69; 252/77; 252/364; 570/164; 570/178
[58] Field of Search ............................. 252/2, 8, 67, 69, 252/77, 364; 570/136, 178, 164; 510/408, 410, 411

[56] References Cited

U.S. PATENT DOCUMENTS

| | | | |
|---|---|---|---|
| 2,599,631 | 6/1952 | Harmon | 260/653 |
| 2,745,886 | 5/1956 | Ruh et al. | 260/653 |
| 3,673,113 | 6/1972 | Naito et al. | 252/441 |
| 4,034,070 | 7/1977 | Wojtowicz et al. | 423/489 |
| 4,053,530 | 10/1977 | Schindel | 260/653.8 |
| 4,158,023 | 6/1979 | Von Halasz . | |
| 4,465,786 | 8/1984 | Zimmer et al. | 502/169 |
| 4,741,893 | 5/1988 | Watanabe et al. | 423/471 |
| 5,084,190 | 1/1992 | Fernandez | 252/8 |
| 5,124,053 | 6/1992 | Iikubo et al. | 252/8 |
| 5,169,873 | 12/1992 | Behme et al. | 521/114 |
| 5,196,616 | 3/1993 | Lee et al. | 570/178 |
| 5,314,682 | 5/1994 | Sweval et al. | 424/45 |
| 5,444,102 | 8/1995 | Nimitz et al. | 521/131 |
| 5,461,177 | 10/1995 | Manzer et al. . | |
| 5,563,304 | 10/1996 | Rao et al. | 570/166 |
| 5,648,016 | 7/1997 | Klug et al. | 252/67 |
| 5,689,019 | 11/1997 | Aoyama et al. | 570/167 |
| 5,912,392 | 6/1999 | Vollmueller et al. | 570/165 |

FOREIGN PATENT DOCUMENTS

| | | | |
|---|---|---|---|
| 2900854 | 7/1979 | Germany | 423/489 |
| WO 93/25506 | 12/1993 | WIPO | C07C 17/20 |
| WO 94/06558 | 3/1994 | WIPO | B01J 23/92 |
| WO 96/05157 | 2/1996 | WIPO | C07C 17/25 |
| WO 97/07052 | 2/1997 | WIPO | C01B 7/19 |

OTHER PUBLICATIONS

P. Daniel et al., Raman–scattering study of crystallized MF3 compounds (M=Al, Cr, GA, V, FE, In): An approach to the short–range–order force constants, *The American Physical Society*, 42, 10545–10552, Dec. 1, 1990.

Keshav N. Shrivastava, Theory of the –electron spin density dur to the Cr3+ion and Cr3+ion pair in a cubic fluoride lattice, *Physical Review*, 20, 5375–5378, Dec. 15, 1979.

Kerro Knox, Structure of Chromium (III) Fluoride, *Short Communications*,507–508, 1960.

*Primary Examiner*—Joseph D. Anthony

[57] ABSTRACT

A process is disclosed for recovering HF from a product mixture including HF and $CF_3CF_2CHF_2$. The process involves (1) distilling the product mixture to remove all products which have a lower boiling point than the lowest boiling azeotrope containing HF and $CF_3CF_2CHF_2$; and (2) distilling the azeotrope to recover HF as an azeotropic composition containing HF and $CF_3CF_2CHF_2$. Also disclosed are compositions of hydrogen fluoride in combination with an effective amount of $CF_3CF_2CHF_2$ to form an azeotrope or azeotrope-like composition with hydrogen fluoride, (e.g., compositions containing from about 57.1 to 67.2 mole percent $CF_3CF_2CHF_2$).

A process for producing certain compositions comprising
(a) $CF_3CF_2CHF_2$ and (b) at least one saturated halogenated hydrocarbon and/or ether having the formula:

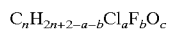

$$C_nH_{2n+2-a-b}Cl_aF_bO_c$$

wherein n is an integer from 1 to 4, a is an integer from 0 to 2n+1, b is an integer from 1 to 2n+2–a, and c is 0 or 1, provided that when c is 1 then n is an integer from 2 to 4 (and provided that component (b) does not include $CF_3CF_2CF_2$) is also disclosed. This process involves (A) combining (i) an azeotropic composition of $CF_3CF_2CHF_2$ and HF with (ii) at least one fluorination precursor compound wherein the precursor component (ii) is the fluorination precursor to component (b); and (B) reacting a sufficient amount of the HF from the azeotropic composition (i) with precursor component (ii), to provide a composition containing components (a) and (b) in the desired ratio. In addition, certain compositions are disclosed which include (a) $CF_3CF_2CHF_2$ and (b) at least two saturated halogenated hydrocarbons and/or ethers having the formula:

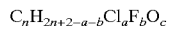

$$C_nH_{2n+2-a-b}Cl_aF_bO_c$$

wherein the molar ratio of said at least one compound to HFC-227ca is between about 1:99 and about 43:57 and c is 1 for at least one of the component (b) compounds.

9 Claims, No Drawings

COMPOSITIONS COMPRISING $CF_3CF_2CHF_2$ AND THEIR MANUFACTURE

This application claims the priority benefit of U.S. Provisional Application Ser. No. 60/056,794, filed Aug. 25, 1997.

FIELD OF THE INVENTION

This invention relates to azeotropic compositions of hydrogen fluoride with halogenated hydrocarbons, their production and their use in manufacturing processes for producing halogenated hydrocarbon mixtures.

BACKGROUND 1,1,1,2,2,3,3 Heptafluoropropane (i.e., $CF_3CF_2CHF_2$ or HFC-227ca), because of its zero ozone depletion potential, is of interest as an environmentally attractive alternative for chlorofluorocarbons (i.e., CFCs) in such established uses as refrigerants, heat transfer media, foam expansion agents, aerosol propellants, solvents, fire extinguishants and power cycle working fluids, among other applications.

$CF_3CF_2CHF_2$ can be obtained, for example, by reacting $CF_3CF_2CHCl_2$ (i.e., 1,1,1,2,2-pentafluoro-3,3-dichloropropane or HCFC-225ca) with HF using various catalysts. Normally, excess HF is used to achieve relatively favorable reactor rates. In both vapor-phase and liquid-phase processes, typical reactor products contain HCl, unreacted $CF_3CF_2CHCl_2$ and HF as well as $CF_3CF_2CHF_2$. HF may be removed from the halogenated hydrocarbon components of the product mixture using conventional aqueous solution scrubbing techniques. However, the production of substantial amounts of scrubbing discharge can create aqueous waste disposal concerns.

There remains a need for processes utilizing HF in such product mixtures as well as an interest in developing more efficient processes for the manufacture of hydrofluorocarbons.

SUMMARY OF THE INVENTION

The present invention provides a process for recovering HF from a product mixture comprising HF and $CF_3CF_2CHF_2$. The process comprises (1) distilling the product mixture to remove all products which have a lower boiling point than the lowest boiling azeotrope containing HF and $CF_3CF_2CHF_2$; and (2) distilling said azeotrope to recover HF as an azeotropic composition containing HF and $CF_3CF_2CHF_2$.

Also provided are compositions which consist essentially of hydrogen fluoride in combination with an effective amount of $CF_3CF_2CHF_2$ to form an azeotrope or azeotrope-like composition with hydrogen fluoride, said composition containing from about 57.1 to 67.2 mole percent $CF_3CF_2CHF_2$.

This invention further provides a process for producing compositions comprising (a) $CF_3CF_2CHF_2$ and (b) at least one saturated compound selected from halogenated hydrocarbons and ethers having the formula:

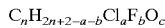

wherein n is an integer from 1 to 4, a is an integer from 0 to 2n+1, b is an integer from 1 to 2n+2−a, and c is 0 or 1, provided that when c is 1 then n is an integer from 2 to 4, and provided component (b) does not include $CF_3CF_2CHF_2$, wherein the molar ratio of component (b) to $CF_3CF_2CHF_2$ is between about 1:99 and about 43:57. This process comprises (A) combining (i) an azeotrope or azeotrope-like composition consisting essentially of $CF_3CF_2CHF_2$ and HF wherein the ratio of HF to $CF_3CF_2CHF_2$ is at least equal to said ratio of component (b) to component (a) with (ii) at least one fluorination precursor compound wherein the precursor component (ii) is the fluorination precursor to component (b); and (B) reacting a sufficient amount of the HF from the azeotrope or azeotrope-like composition (i) with precursor component (ii), to provide a composition containing components (a) and (b) in said ratio.

In addition, compositions are provided comprising (a) $CF_3CF_2CHF_2$ and (b) at least two saturated compounds selected from halogenated hydrocarbons and ethers having the formula:

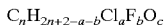

provided that component (b) does not include $CF_3CF_2CHF_2$, wherein the molar ratio of component (b) to HFC-227ca is between about 1:99 and about 43:57 and provided that c is 1 for at least one of the component (b) compounds.

DETAILED DESCRIPTION OF THE INVENTION

The process of this invention involves azeotropic distillation of HF with $CF_3CF_2CHF_2$ (HFC-227ca). The product mixtures distilled in accordance with this invention can be obtained from a variety of sources. These sources include product mixtures produced by fluorination with HF of at least one compound of the formula $CHX_2(C_2X_5)$ where each X is independently Cl or F, provided that least one X is Cl. Of note are compounds of formula $CHX_2CF_2CX_3$ (e.g., $CF_3CF_2CHCl_2$). HCFC-225ca can be prepared by the addition of $CHCl_2F$ to $CF_2=CF_2$ catalyzed by aluminum chlorofluoride as disclosed in U.S. Pat. No. 5,157,171. The product mixtures may for example be obtained by reacting $CClF_2CF_2CHClF$ (i.e., 1,1,2,2,3-pentafluoro-1,3-dichloropropane or HCFC-225cb), $CHF_2CF_2CCl_2F$ (i.e., 1,1,2,2,3-pentafluoro-3,3-dichloropropane or HCFC-225cc), $CF_3CCl_2CHF_2$ (i.e., 1,1,1,3,3-pentafluoro-2,2-dichloropropane or HCFC-225aa), $CF_3CClFCHClF$ (i.e., 1,1,1,2,3-pentafluoro-2,3-dichloro-propane or HCFC-225ba), $CHF_2CClFCClF_2$ (i.e., 1,1,2,3,3-pentafluoro-1,2-dichloropropane or HCFC-225bb), $CF_3CF_2CHCl_2$ (i.e., 1,1,1,2,2-pentafluoro-3,3-dichloropropane or HCFC-225ca), $CCl_3CF_2CHCl_2$ (1,1,1,3,3-pentachloro-2,2-5 difluoropropane or HCFC-222ca), $CCl_2FCF_2CHCl_2$ (1,1,3,3-tetrachloro-1,2,2-trifluoropropane or HCFC-223ca) or mixtures thereof, optionally including $CF_3CF_2CHCl_2$, with excess HF in the presence of various catalysts. The product mixtures may also be obtained by reacting $CF_3CF_2CHClF$ (i.e., 1,1,1,2,2,3-hexa-fluoro-3-chloropropane or HCFC-226ca), $CClF_2CF_2CHF_2$ (i.e., 1,1,2,2,3,3-hexa-fluoro-1-chloropropane or HCFC-226cb), $CF_3CClFCHF_2$ (i.e., 1,1,1,2,3,3-hexa-fluoro-2-chloropropane or HCFC-226ba), or mixtures thereof with excess HF in the presence of various catalysts. The product mixtures may also be obtained by reacting $CClF_2CF_2CHCl_2$ (1,3,3-trichloro-1,1,2,2-tetrafluoropropane or HCFC-224ca) which may be prepared from $CHCl_3$ and $CF_2=CF_2$ in the presence of $AlCl_3$ as disclosed in U.S. Pat. No. 2,462,402. Another useful route to HFC-227ca/HF mixtures is by fluorination of $CCl_3CCl_2CHCl_2$ (1-hydrohepta-chloropropane or HCC-220aa) with excess HF. HCC-220aa can be prepared by the addition of $CHCl_3$ to $CCl_2=CCl_2$ catalyzed by $AlCl_3$. The described catalytic fluorination with HF reactions can be done in either the liquid or vapor phase. Product mixtures may also be provided by adding HFC-227ca to HF-containing compositions.

In accordance with this invention, the product mixture is distilled to remove all products which have a lower boiling point than the lowest boiling azeotrope containing HF and $CF_3CF_2CHF_2$. Such low-boiling materials can include, for example, HCl. For continuous processes, distillate and azeotropes with higher boiling points can be advantageously removed from appropriate sections of the distillation column.

In accordance with this invention, the lowest boiling azeotrope containing HF and $CF_3CF_2CHF_2$ is then distilled such that HF is recovered as an azeotropic composition containing HF together with $CF_3CF_2CHF_2$. For example, where the mixture (after distilling components boiling at lower temperatures than the lowest boiling azeotrope of HF with $CF_3CF_2CHF_2$) consists essentially of HF and $CF_3CF_2CHF_2$, HF may be recovered as an azeotrope consisting essentially of $CF_3CF_2CHF_2$ and HF. If excess amounts of $CF_3CF_2CHF_2$ or HF remain after azeotropes are recovered from these mixtures, such excess may be recovered as a relatively pure compound. The distillation of azeotropes containing HF and $CF_3CF_2CHF_2$ may be done at a wide variety of temperatures and pressures.

Typically the temperature is between about −25° C. and about 100° C. (e.g., from −10° C. to 70° C.) and the pressure is between 77 kPa and 3566 kPa (e.g., from about 149 kPa to about 1774 kPa). Examples of temperatures and pressures suitable for azeotropic formation are provided below. The process of this invention includes embodiments where azeotropic compositions containing from about 57.1 to about 67.2 mole percent $CF_3CF_2CHF_2$ are recovered. HF may be recovered for example, from a product mixture including $CF_3CF_2CHF_2$ formed by the reaction of $CF_3CF_2CHCl_2$ with HF.

The distillation equipment and its associated feed lines, effluent lines and associated units should be constructed of materials resistant to hydrogen fluoride, hydrogen chloride and chlorine. Typical materials of construction, well-known to the fluorination art, include stainless steels, in particular of the austenitic type, and the well-known high nickel alloys, such as Monel® nickel-copper alloys, Hastelloy® nickel-based alloys and, Inconel® nickel-chromium alloys. Also suitable for reactor fabrication are such polymeric plastics as polytrifluorochloro-ethylene and polytetrafluoroethylene, generally used as linings.

The present invention provides compositions which consist essentially of hydrogen fluoride and an effective amount of $CF_3CF_2CHF_2$ to form an azeotropic combination with hydrogen fluoride. By effective amount is meant an amount which, when combined with HF, results in the formation of an azeotrope or azeotrope-like mixture. As recognized in the art, an azeotrope or an azeotrope-like composition is an admixture of two or more different components which, when in liquid form under given pressure, will boil at a substantially constant temperature, which temperature may be higher or lower than the boiling temperatures of the individual components, and which will provide a vapor composition essentially identical to the liquid composition undergoing boiling.

An azeotrope is a liquid mixture that exhibits a maximum or minimum boiling point relative to the boiling points of surrounding mixture compositions. An azeotrope is homogeneous if only one liquid phase is present. An azeotrope is heterogeneous if more than one liquid phase is present. Regardless, a characteristic of minimum boiling azeotropes is that the bulk liquid composition is then identical to the vapor composition in equilibrium therewith, and distillation is ineffective as a separation technique. For the purpose of this discussion, azeotrope-like composition means a composition which behaves like an azeotrope (i.e., has constant-boiling characteristics or a tendency not to fractionate upon boiling or evaporation). Thus, the composition of the vapor formed during boiling or evaporation of such compositions is the same as or substantially the same as the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

Accordingly, the essential features of an azeotrope or an azeotrope-like composition are that at a given pressure, the boiling point of the liquid composition is fixed and that the composition of the vapor above the boiling composition is essentially that of the boiling liquid composition (i.e., no fractionation of the components of the liquid composition takes place). It is also recognized in the art that both the boiling point and the weight percentages of each component of the azeotropic composition may change when the azeotrope or azeotrope-like liquid composition is subjected to boiling at different pressures. Thus an azeotrope or an azeotrope-like composition may be defined in terms of the unique relationship that exists among components or in terms of the compositional ranges of the components or in terms of exact weight percentages of each component of the composition characterized by a fixed boiling point at a specified pressure. It is also recognized in the art that various azeotropic compositions (including their boiling points at particular pressures) may be calculated (see, e.g., W. Schotte, Ind. Eng. Chem. Process Des. Dev. 1980, 19, pp 432–439). Experimental identification of azeotropic compositions involving the same components may be used to confirm the accuracy of such calculations and/or to modify the calculations for azeotropic compositions at the same or other temperatures and pressures.

A composition may be formed which consists essentially of azeotropic combinations of hydrogen fluoride and $CF_3CF_2CHF_2$. This includes a composition consisting essentially of from about 42.9 to about 32.8 mole percent HF and from about 57.1 to 67.2 mole percent $CF_3CF_2CHF_2$ (which forms an azeotrope boiling at a temperature from between about −25° C. and about 100° C. and a pressure between about 77 kPa and about 3566 kPa).

At atmospheric pressure, the boiling points of hydrofluoric acid and HFC-227ca are about 19.5° C. and −17.0° C., respectively. However, the relative volatility at 149 kPa (21.7 psia) and −10° C. of HF and HFC-227ca was found to be nearly 1.0 as 42.5 mole percent HF and 57.5 mole percent HFC-227ca was approached. These data indicate that the use of conventional distillation procedures will not result in the separation of a substantially pure compound because of the low value of relative volatility of the compounds.

To determine the relative volatility of HF with HFC-227ca, the so-called PTx Method was used. In this procedure, the total absolute pressure in a cell of known volume is measured at a constant temperature for various known binary compositions. Use of the PTx Method is described in greater detail in "Phase Equilibrium in Process Design", Wiley-Interscience Publisher, 1970, written by Harold R. Null, on pages 124 to 126, the entire disclosure of which is hereby incorporated by reference. Samples of the vapor and liquid, or vapor and each of the two liquid phases under those conditions where two liquid phases exist, were obtained and analyzed to verify their respective compositions.

These measurements can be reduced to equilibrium vapor and liquid compositions in the cell by an activity coefficient equation model, such as the Non-Random, Two-Liquid (NRTL) equation, to represent liquid phase non-idealities. Use of an activity coefficient equation, such as the NRTL equation, is described in greater detail in "The Properties of Gases and Liquids", 4th Edition, publisher McGraw Hill, written by Reid, Prausnitz and Poling, on pages 241 to 387; and in "Phase Equilibria in Chemical Engineering", published by Butterworth Publishers, 1985, written by Stanley M. Walas, pages 165 to 244; the entire disclosure of each of the previously identified references are hereby incorporated by reference.

Without wishing to be bound by any theory or explanation, it is believed that the NRTL equation can sufficiently predict whether or not mixtures of HF and HFC-227ca behave in an ideal manner, and can sufficiently predict the relative volatilities of the components in such mixtures. Thus, while HF has a good relative volatility compared to HFC-227ca at low HFC-227ca concentrations, the relative volatility becomes nearly 1.0 as 61 mole percent HFC-227ca was approached at 20° C. This would make it impossible to separate HFC-227ca from HF by conventional distillation from such a mixture. Where the relative volatility approaches 1.0 defines the system as forming a near-azeotrope. Where the relative volatility is 1.0 defines the system as forming an azeotrope.

It has been found that azeotropes of HF and HFC-227ca are formed at a variety of temperatures and pressures. At a pressure of 21.7 psia (149 kPa) and −10° C., the azeotrope vapor composition was found to be about 42.5 mole percent HF and about 57.5 mole percent HFC-227ca. At a pressure of 257 psia (1774 kPa) and 70° C., the azeotrope vapor composition was found to be about 37.9 mole percent HF and 62.1 mole percent HFC-227ca. Based upon the above findings, it has been calculated that an azeotropic composition of about 42.9 mole percent HF and about 57.1 mole percent HFC-227ca can be formed at −25° C. and 11.2 psia (77 kPa) and an azeotropic composition of about 32.8 mole percent HF and about 67.2 mole percent HFC-227ca can be formed at about 100° C. and 517 psia (3566 kPa). Accordingly, the present invention provides an azeotrope or azeotrope-like composition consisting essentially of from about 42.9 to 32.8 mole percent HF and from about 57.1 to 67.2 mole percent HFC-227ca, said composition having a boiling point from about −25° C. at 77 kPa to about 100° C. at 3566 kPa.

The HFC-227ca can be separated from its azeotrope with HF by conventional means such as neutralization and decantation. However the azeotropic composition of HFC-227ca and HF is useful as recycle to a fluorination reactor, where the recycled HF can function as a reactant and the recycled HFC-227ca can function to moderate the heat of reaction. It will also be apparent to one of ordinary skill in the art that distillation including azeotropes with HF can typically be run under more convenient conditions than distillation without HF (e.g., where HF is removed prior to distillation).

The HFC-227ca/HF azeotrope can be used as an HF source to fluorinate numerous compounds. Optionally, such fluorinations can employ a fluorination catalyst. The fluorinations can be done in the liquid phase using typical catalysts such as $SbCl_5$. The fluorinations can also be done in the vapor phase using typical catalysts such as $Cr_2O_3$. Of note, however, are vapor phase fluorinations in the presence of a catalytic composition comprising cubic chromium trifluoride (i.e., chromium trifluoride having an X-ray diffraction powder pattern as shown in Table I.

TABLE I

Powder X-ray diffraction Data for Cubic-$CrF_3$

| d spacing (Å) | Relative intensity[a] | H | K | L |
|---|---|---|---|---|
| 5.8888 | VS[b] | 1 | 1 | 1 |
| 3.0674 | S[c] | 3 | 1 | 1 |
| 2.9423 | M[d] | 2 | 2 | 2 |
| 2.0818 | W[e] | 4 | 2 | 2 |
| 1.9547 | W[e] | 5 | 1 | 1 |
| 1.7991 | M[d] | 4 | 4 | 0 |

[a] as recorded at room temperature using a conventional diffractometer such as SCINTAG (PAD IV) diffractometer with copper k-alpha radiation
[b] VS means very strong (e.g., a relative intensity of about 100)
[c] S means strong (e.g., a relative intensity of about 46)
[d] M means moderate (e.g., a relative intensity of about 33 and about 14 for d spacing of 2.9423 and 1.7991, respectively)
[e] W means weak (e.g., a relative intensity of about 7 and about 4 for d spacing of 2.0818 and 1.9547, respectively)

Cubic chromium trifluoride may be prepared from $CrF_3 \cdot XH_2O$, where X is 3 to 9, preferably 4, by heating in air or an inert atmosphere (e.g., nitrogen or argon) at 350° C. to 400° C. for 3 to 12 hours, preferably 3 to 6 hours. The color of cubic chromium trifluoride is dark green. Cubic chromium trifluoride is useful by itself and together with other chromium compounds, as a catalytic material. Of note are catalyst compositions comprising chromium wherein at least 10% of the chromium is in the form of cubic chromium trifluoride, particularly catalyst compositions wherein at least 25% of the chromium is in the form of cubic chromium trifluoride, and especially catalyst compositions wherein at least 60% of the chromium is in the form of cubic chromium trifluoride. The chromium, including the cubic chromium trifluoride can be supported on and/or physically mixed with materials such as carbon, aluminum fluoride, fluorided alumina, lanthanum fluoride, magnesium fluoride, calcium fluoride, zinc fluoride and the like. Preferred are combinations including cubic chromium trifluoride in combination with magnesium fluoride and/or zinc fluoride. Chromium trifluoride catalyst which consists essentially of cubic chromium trifluoride can also be prepared and used in accordance with this invention.

By fluorination precursors to the component (b) compound(s) is meant compounds which react with HF (optionally in the presence of a fluorination catalyst) to produce the corresponding component (b) compound(s). Fluorination precursors include saturated compounds having the formula $$C_nH_{2n+2-a-b}Cl_{a+x}F_{b-x}O_c$$

wherein x is an integer from 1 to b. Examples of saturated precursors and corresponding products are as follows:

| SATURATED PRECURSOR | PRODUCT |
|---|---|
| $CH_2Cl_2$ | $CH_2F_2$ |
| $CHCl_2CHCl_2$ | $CHF_2CHF_2$ |
| $CF_3CH_2Cl$ | $CF_3CH_2F$ |
| $CH_2ClCF_2CHF_2$ | $CH_2FCF_2CHF_2$ |
| $CH_3CF_2CCl_3$ | $CH_3CF_2CF_3$ |

-continued

| SATURATED PRECURSOR | PRODUCT |
|---|---|
| $CHCl_2CH_2CCl_3$ | $CHF_2CH_2CF_3$ |
| $CHCl_2OCF_2CHF_2$ | $CHF_2OCF_2CHF_2$ |
| $CF_3CHClOCHF_2$ | $CF_3CHFOCHF_2$ |
| $CHF_2OCHCl_2$ | $CHF_2OCHF_2$ |
| $CClF_2OCHF_2$ | $CF_3OCHF_2$ |

Fluorination precursors also include unsaturated compounds having the formula $$C_nH_{2n+1-a-b}Cl_{a+y}F_{b-y-1}O_c$$

wherein y is an integer from 0 to b−1. Examples of unsaturated precursors and corresponding products are as follows:

| UNSATURATED PRECURSOR | PRODUCT |
|---|---|
| $CH_2=CF_2$ | $CH_3CF_3$ |
| $CH_2=CH_2$ | $CH_3CH_2F$ |
| $CH_2=CCl_2$ | $CH_3CCl_2F$ |
| $CF_3CH=CH_2$ | $CF_3CH_2CH_2F$ |
| $CF_3CCl=CCl_2$ | $CF_3CHClCClF_2$ |
| $CF_3CF=CHF$ | $CF_3CHFCHF_2$ |
| $CF_3CH=CF_2$ | $CF_3CH_2CF_3$ |
| $CF_3OCF=CF_2$ | $CF_3OCHFCF_3$ |

Of particular note are processes where for component (b) a is 0 and b is 2n+1, or less.

The precursor compounds, either individually or in mixed blends, can be fluorinated with the HF azeotrope to provide a variety of compositions wherein the ratio of the fluorination product(s) to HFC-227ca is between about 1:99 to 43:57 (depending upon the azeotropic combination of HFC-227ca and HF used, the particular precursor(s) and the degree of fluorination). Of note are embodiments of this fluorination where the HFC-227ca/HF azeotrope combined with the precursor(s) is obtained by the process of recovering HF from a product mixture comprising HF and $CF_3CF_2CHF_2$ described above (i.e., by (1) distilling a product mixture comprising HF and $CF_3CF_2CHF_2$ to remove all products which have a lower boiling point than the lowest boiling azeotrope containing HF and $CF_3CF_2CHF_2$; and (2) distilling said azeotrope to recover HF as an azeotropic composition containing HF and $CF_3CF_2CHF_2$).

Of note are processes where the fluorination precursors include precursors for at least two saturated compounds of the formula $C_nH_{2n+2-a-b}Cl_aF_bO_c$, where c is 1 for at least one of said saturated compounds. The fluorination product components may be separated by conventional means such as distillation, selective sorption and/or decantation. The compositions of this invention comprising $CF_3CF_2CHF_2$ and at least two saturated compounds (at least one of which is an ether) are useful, for example, as aerosol propellants, fire extinguishants and/or refrigerants.

Some of the components of the $CF_3CF_2CHF_2/C_nH_{2n+2-a-b}Cl_aF_bO_c$ combinations may form HCl azeotropes. The HCl can be separated from those combinations by extractive distillation or sorption on activated carbon. A number of the combinations may boil too close together to separate by distillation (e.g., HFC-227ca boils at −17.0° C. at 760 mm and $CH_3CF_2CF_3$ boils at −19.6° C. at 760 mm), forming zeotropic blends (i.e., blends boiling within a limited temperature range). Some of the combinations may form binary or ever ternary azeotropes. The azeotropes, zeotropes and individual compounds can be collected from different parts of a distillation column.

EXAMPLE 1

Preparation of $CF_3CF_2CHF_2$ by Vapor Phase Fluorination of a $C_3HCl_2F_5$ Mixture A 30 mL Hastelloy™ nickel alloy tubular reactor is packed with 39.9 g of 12–20 mesh (1.68–0.84 mm) chromium(III) oxide catalyst. The catalyst is activated by heating to 175° C. in a nitrogen flow and then is treated with a 1:1 mixture of HF and $N_2$ at 175° C. for about 0.5 hours. The feed gas is then changed to 4:1 $HF:N_2$ and the reactor temperature is increased to 400° C. over the course of 2 hours and then is held at 400° C. for 0.5 hours. The catalyst is then cooled under a nitrogen flow.

A 4:1 mixture of HF and dichloropentafluoropropanes is fed to the reactor with a catalyst contact time of 30 seconds at 325° C. The dichloropentafluoro-propane mixture contains (in area % as measured by gas chromatography) 12.4% $CHCl_2C_2F_5$ (HCFC-225ca), 84.3% $CHClFCF_2CClF_2$ (HCFC-225cb), 2.1% $CHF_2CCl_2CF_3$ (HCFC-225aa), 1.0% $CHClFCClFCF_3$ (HCFC-225ba), and 0.1% $CHF_2CClFCClF_2$ (HCFC-225bb). The organic composition of the reactor effluent at 325° C. consists of (area %) 39% $CF_3CF_2CHF_2$, 38% $C_3HClF_6$, 6% $C_3HCl_2F_5$ and 17% of other products.

The entire reactor effluent is distilled and lower boiling material, such as HCl, is removed from the top of the distillation column. The $CF_3CF_2CHF_2$/HF azeotrope is removed from a section below the top of the column.

EXAMPLE 2

Reaction of the $CF_3CF_2CHF_2$/HF Azeotrope with $CH_2Cl_2$

Preparation of Cubic Chromium Trifluoride

Commercial rhombohedral $CrF_3 \cdot 4H_2O$ (about 3 g) was placed in a gold container and heated to 400° C. for 3–12 hours in air. The product was recovered and characterized. Powder x-ray diffraction measurements were recorded at room temperature using a SCINTAG (PAD IV) commercial diffractometer and indicated that the crystal structure of the product formed can be indexed as cubic with a lattice parameter of 10.201Å(Table 2). The samples were weighed before and after the experiments. Weight loss measurements showed the compound formed at 400° C./6 hours is $CrF_3$ (Table 1) as shown in the equation, $$CrF_3 \cdot 4H_2O \rightarrow CrF_3 + 4H_2O.$$

(Weight loss observed: 39.8%, Weight loss calculated 39.77%). The intensities of X-ray diffraction data show the compound has a face-centered cubic unit cell with space group Fd3m.

TABLE 1

| Temp./time | Obs. Weight loss | Phase formation |
|---|---|---|
| 200° C./12 hr | 25.6% | Amorphous |
| 250° C./6 hr | 28.4 | Amorphous |
| 300° C./6 hr | 31.1% | Amorphous + Cubic |
| 350° C./12 hr | 39.3% | Cubic |
| 400° C./3 hr | 38.6% | Cubic |
| 400° C./6 hr | 39.8% | Cubic |
| 400° C./12 hr | 51.0% | Amorphous + Cubic |
| 500° C./3 hr | 52.4% | $CrOF_2 + Cr_2O_3$ + amor. + Cubic |

TABLE 2

Powder X-ray diffraction Data for Cubic-$CrF_3$
($CrF_3 \cdot 4H_2O$, 400° C./6 hours)

| d spacing (Å) | Relative Intensity | H | K | L |
|---|---|---|---|---|
| 5.8888 | 100 | 1 | 1 | 1 |
| 3.0674 | 46 | 3 | 1 | 1 |
| 2.9423 | 33 | 2 | 2 | 2 |
| 2.0818 | 7 | 4 | 2 | 2 |
| 1.9547 | 4 | 5 | 1 | 1 |
| 1.7991 | 14 | 4 | 4 | 0 |

Catalyst Preparation for Use Fluorination

Commercial $CrF_3 \cdot 4H_2O$ (about 54 g) was placed in a gold container and heated to 400° C. for 3 hours. The product was granulated to form 1.2 to 1.7 mm particles for catalytic evaluation. The granulated product was subsequently treated with anhydrous HF at 400° C. for 4 hours as described below. The x-ray diffraction powder pattern of the product was essentially the same as that given for cubic $CrF_3$ in Table 2.

General Procedure for HF Treatment of Cubic $CrF_3$

The granulated catalyst (9.2 g, 10 mL) was placed in a ⅝"(1.58 cm) Inconel® nickel alloy reactor heated in a fluidized sand bath. It was heated to 175° C. in a flow of nitrogen (50 cc/min) at which time HF flow (50 cc/min) was also started through the reactor. After 15 minutes, the nitrogen flow was decreased to 20 cc/min and the HF flow increased to 80 cc/min. The reactor temperature was gradually increased to 400° C. during a 2 hour period and maintained at 400° C. for an additional 30 minutes. At the end of this period the reactor was brought to the desired operating temperature for catalyst evaluation under a nitrogen flow of 10 cc/min and an HF flow of 50 cc/min.

Fluorination Step

The reactor temperature is maintained at 250° C. and the flows of HF and nitrogen are stopped. To the reactor are fed an azeotrope of HF and $CF_3CF_2CHF_2$ containing 40 mole % HF and $CH_2Cl_2$ at a molar ratio of HF:$CH_2Cl_2$ of 0.8:1 and at a rate such that the contact time is 30 seconds. The reactor product effluent contains $CH_2F_2$.

What is claimed is:

1. A composition consisting essentially of hydrogen fluoride in combination with an effective amount $CF_3CF_2CHF_2$ to form an azeotrope or azeotrope-like composition with hydrogen fluoride, said composition containing from about 57.1 to 67.2 mole percent $CF_3CF_2CHF_2$.

2. The composition of claim 1 consisting essentially of from about 42.9 to 32.8 mole percent HF and has about 57.1 to 67.2 mole percent $CF_3CF_2CHF_2$, said composition having a boiling point from about −25° C. at 77 kPa to about 100° C. at 3566 kPa.

3. The composition of claim 1 consisting essentially of from about 42.5 to about 37.9 mole percent HF and from about 57.5 to about 62.1 mole percent 1,1,1,2,2,3,3-heptafluoropropane which forms an azeotrope boiling at a temperature between about −10° C. and 70° C. and a pressure between about 149 kPa and 1774 kPa.

4. The composition of claim 1 consisting essentially of about 32.8 mole percent HF and about 67.2 mole percent $CF_3CF_2CHF_2$ which boils at about 100° C. and 3566 kPa.

5. A process for recovering HF from a product mixture comprising HF and $CF_3CF_2CHF_2$, comprising:

(1) distilling the product mixture to remove all products which have a lower boiling point than the lowest boiling azeotrope containing HF and $CF_3CF_2CHF_2$; and (2) distilling said azeotrope to recover HF as an azeotropic composition of claim 1.

6. The process of claim 1 wherein HF is recovered from a product mixture including $CF_3CF_2CHF_2$ formed by the reaction of HF with at least one compound having the formula $CHX_2(C_2X_5)$ wherein each X is independently Cl or F, provided that at least one X is Cl.

7. A process for producing compositions comprising (a) $CF_3CF_2CHF_2$ and (b) at least one saturated compound selected from halogenated hydrocarbons and ethers having the formula

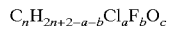

$$C_nH_{2n+2-a-b}Cl_aF_bO_c$$

wherein n is an integer from 1 to 4, a is an integer from 0 to 2n+1, b is an integer from 1 to 2n+2−a, and c is 0 or 1, provided that when c is 1 then n is an integer from 2 to 4, and provided that component (b) does not include $CF_3CF_2CHF_2$, wherein the molar ratio of component (b) to $CF_3CF_2CHF_2$ is between about 1:99 and about 43:57, comprising:

(A) combining (i) an azeotrope or azeotrope-like composition of claim 1 consisting essentially of $CF_3CF_2CHF_2$ and HF wherein the ratio of HF to $CF_3CF_2CHF_2$ is at least equal to said ratio of component (b) to component (a) with (ii) at least one fluorination precursor compound wherein the precursor component (ii) is the fluorination precursor to component (b); and (B) reacting a sufficient amount of the HF from the azeotrope or azeotrope-like composition (i) with precursor component (ii) to provide a composition containing components (a) and (b) in said ratio.

8. The process of claim 7 wherein the azeotrope or azeotrope-like composition (i) is produced by:

(1) distilling a product mixture comprising HF and $CF_3CF_2CHF_2$ to remove all products which have a lower boiling point than the lowest boiling azeotrope containing HF and $CF_3CF_2CHF_2$; and (2) distilling said azeotrope to recover HF as an azeotropic composition containing HF and $CF_3CF_2CHF_2$.

9. The process of claim 7 wherein in (B) a catalyst is used which comprises cubic chromium trifluoride having the following X-ray diffraction powder pattern:

| d spacing (Å) | Relative Intensity | H | K | L |
|---|---|---|---|---|
| 5.8888 | VS | 1 | 1 | 1 |
| 3.0674 | S | 3 | 1 | 1 |
| 2.9423 | M | 2 | 2 | 2 |
| 2.0818 | W | 4 | 2 | 2 |
| 1.9547 | W | 5 | 1 | 1 |
| 1.7991 | M | 4 | 4 | 0. |

* * * * *